Patented Sept. 24, 1935

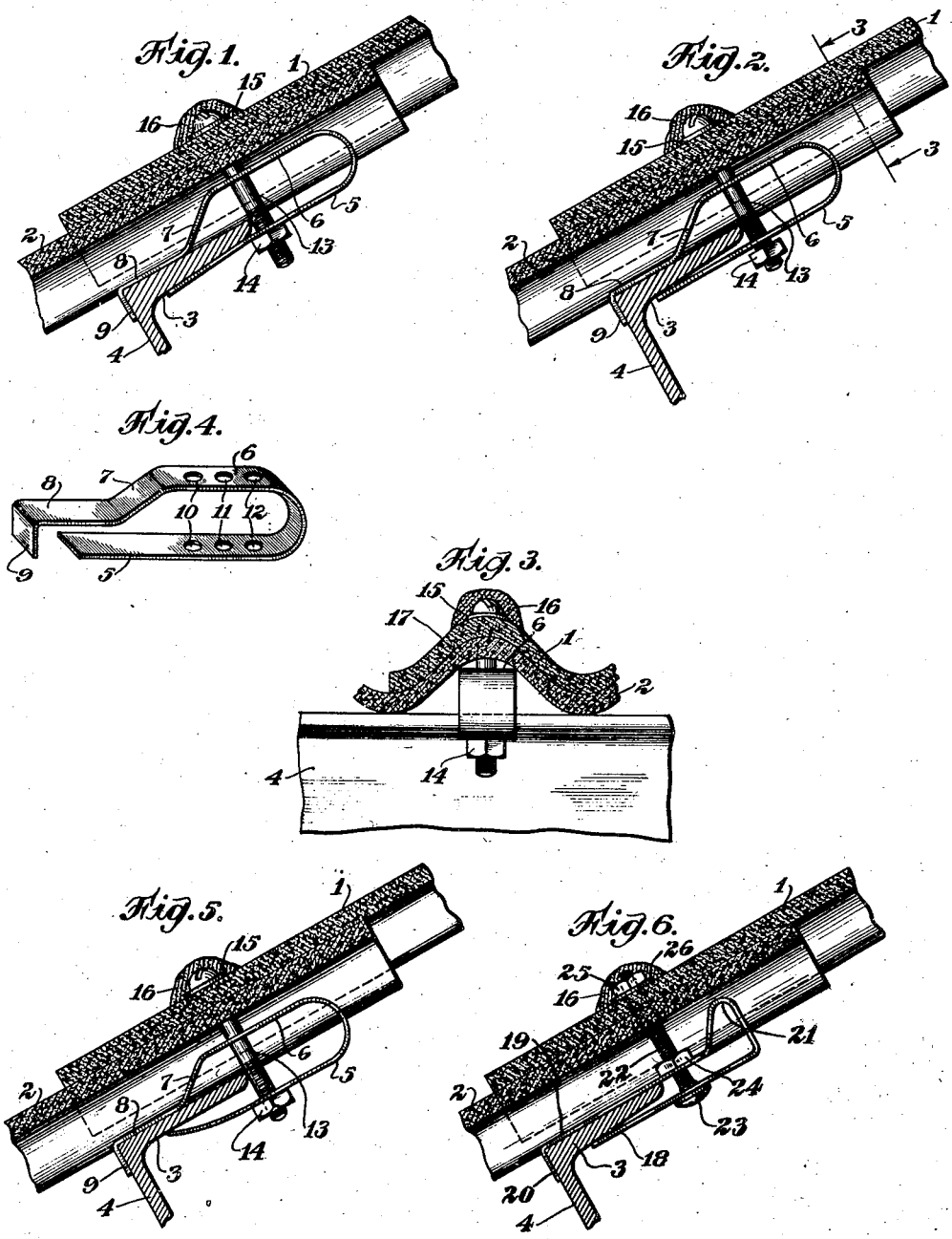

2,015,129

UNITED STATES PATENT OFFICE 2,015,129

STRUCTURAL ASSEMBLY

Paul A. Voigt, Ozone Park, and Aaron E. Shultis, Yonkers, N. Y., assignors to Johns-Manville Corporation, New York, N. Y., a corporation of New York Application September 9, 1932, Serial No. 632,292

5 Claims. (Cl. 108—33)

This invention relates to a structural assembly comprising sheets of covering material, a supporting substructure, and improved fastening means securing the sheets to the substructure.

A type of roof or wall covering that is widely used consists of large sheets of corrugated material, such as metal or rigid stone-like compositions, as, for example, those consisting essentially of asbestos fibers and Portland cement in compressed and densified and hardened condition.

It is an object of the invention to provide a fastener or clip that is both convenient to apply and effective in securing such sheets of corrugated material to the supporting substructures in such manner that the fastener is prevented from slipping in any direction. It is a further object to provide a fastener that holds the corrugated sheets to the substructure by means of a spring action which increases the thoroughness of the engagement of the fastener on the support. A further object is to provide a fastener that may be applied to supports of different sizes or shapes, without the perforation of the supports. Other objects and advantages will appear as the description of the invention progresses.

The invention comprises, in combination, roofing sheets, a supporting substructure, a spring clip or fastener that may be somewhat U-shaped and adapted to engage a supporting member, provided with a body or web member and flange, by gripping the opposite surfaces of the flange and also the surface of the web member that is opposite the flange, and means for securing the roofing sheets to the clip. In the finished structural assembly a leg of the clip contacts with the under side of the roof or sheet and holds the end portion of the other leg of the clip tightly against the under side of the flange of the support.

The invention is illustrated in the drawing in which,

Fig. 1 shows a cross sectional view of a roof structure with one of the improved fasteners in place.

Fig. 2 shows a similar view in which the fastener is not tightly secured in the clamping position.

Fig. 3 shows a cross sectional view along the section line 3—3 of Fig. 2, in the direction of the arrows.

Fig. 4 shows a perspective view of a preferred form of the fastener or clip.

Fig. 5 shows a cross sectional view of a roofing assembly in which a modified form of clip or fastener is used, in which assembly the fastener is not tightly secured in clamping position.

Fig. 6 shows a cross sectional view of a roof assembly in which there is used a modified form of fastening means adapted to be secured by the insertion of a fastening bolt through the corrugated roofing from the under side.

In the various figures like reference characters denote like parts.

Thus, there is shown corrugated roofing sheets 10 I and 2, in overlapping relationship, supported on a substructure including purlins or beams, suitably angle or channel irons, provided with a flanged portion 3 extending laterally from a body or web portion 4.

Engaging the purlin is a spring clip or fastener that is substantially U-shaped and has a leg 5 and another longer leg. The two legs are connected at one end thereof by an intermediate spring portion. A portion 6 of the longer leg is spaced from the leg 5, lies in a plane approximately parallel to that of the leg 5, and bears for a substantial length against the under side of the covering sheet 2, in spring engagement therewith. This longer leg may have an inclined stiffening, springy or resilient portion 7 extending inwardly, towards the plane of the leg 5, and a straight portion 8 lying in a plane different from that of the portion 6 but approximately parallel thereto, engaging the upper surface of the flange of the supporting purlin and terminating in an offset flange 9 extending towards the plane of the shorter leg and engaging the edge of the web member 4 of the purlin that is opposite to the flange. The inclined portion 8 connects the two parallel portions 6 and 8.

It will be observed that such a clip will not readily become disengaged accidentally from the support. The straight portion 6, contacting securely with the under surface of the corrugated roofing, not only affords a spring support to the roofing, but also ensures a tight, spring contact of the end of the shorter leg 5 of the clip against the under surface of the flange 3 of the purlin. Further, this portion 6 engages a corrugation and thus provides means for preventing slipping of the clip longitudinally with respect to the purlin support. At the same time, the flange 9 of the clip provides means for preventing or limiting the slipping of the clip in a direction transverse to the length of the supporting member, a function to which the fastening element 13 contributes.

The spaced portion 6 contacts with the under side of the covering sheet 2 when the leg 5 engages the lower side of the flange of the purlin and extends therefrom in a direction approximately parallel to the general plane of the covering.

To adapt the spring clip or fastener for use with purlins or supports of different widths of flanges, there are provided pairs of spaced and aligned apertures, indicated by 10, 11 and 12, in Fig. 4, consisting of a plurality of spaced holes in each leg of the clip. In the finished assembly, a bolt 13 or other fastening element is inserted through holes in the overlapping sheets 1 and 2, and through a selected pair of holes in the clip. This series of pairs of aligned openings makes it possible to insert the bolt in a position near the edge of the flange of purlins of various widths of flange and thus hold the leg 5 and the upper, longer leg of the clip tightly against opposite surfaces of the flange.

The washer 15 under the head 16 of the bolt 13 and above the upper surface of the sheet 1 serves to protect the edges of the hole through which the bolt is passed and also makes possible the use in the sheeting of a hole of such width as to allow considerable variation between the center of the hole and the centers of the holes 10, 11 or 12 by means of which the bolt engages the clip.

The bolt 13 and nut 14 may be of usual type. With the improved clip and assembly illustrated, this bolt may be of one selected length, even though the flanges on the supports may vary considerably in thickness. To protect the head of the bolt and the washer from the weather, there may be applied a weather-proof putty 16 covering the head of the bolt and the washer.

The modified form of clip shown in Fig. 5 has the leg 5 bent inwardly at its forward portion, as illustrated, in order to increase the tightness of the engagement after the nut 14 is tightened on bolt 13.

It will be seen that the covering sheets rest in approximately parallel relationship upon the upper side of the flange of the purlin.

In making the assemblies illustrated in Figs. 1, 2, 3 and 5, the clip is placed on the purlin so that the two legs of the clip straddle the flange 3, with the shorter leg 5 in contact with the face of the flange that is remote from the sheet 2 and the widely spaced straight portion 6 of the longer leg in contact with the under or inner surface of a corrugation 17 of the said sheet. The straight portion 8 of the clip contacts with the upper face of the flange 3 while the offset lip 9 engages the edge of the body or web portion 4 of the purlin. The bolt 13 is then passed through the holes in the covering sheets 1 and 2 and through the appropriate set of apertures 10, 11 or 12, of the clip. The nut 14 is then screwed onto the bolt and the parts are caused to take first the approximate position shown in Fig. 2 and then the position shown in Fig. 1. The clip is thus maintained in firm and conforming contact with the three sides of the supporting purlin and against the under or inner side of the corrugation 17.

In the modification shown in Fig. 6, the clip comprises a straight leg 18 disposed beneath the flange 3 of the purlin, a longer leg 19, with a long straight portion above and in contact with the flange of the purlin over approximately the entire width of the flange and an offset lip 20 engaging the edge of the web member that is opposite the flange. The two legs of the clip are united by a curved portion provided with a shoulder or hump 21 which extends upwardly to the under side of the sheet of corrugated roofing 2 and rests under the crest of a corrugation. The bolt 22 is threaded over a large portion or all of its length and is passed through registering holes in the two legs of the clip. The head 23 is engaged below the lower leg. Immediately above the upper leg is a nut 24 which is screwed down in such manner as to hold the two legs tightly against the opposite faces of the flange 3 and secure the fastening element or bolt and maintain it in position in the clip. A nut 25 is screwed onto the bolt above the upper side of the corrugated sheet of roofing, to secure the fastening element to the roofing. The nut and bolt end may be provided with washer 26 and weather-proof putty coating 16.

In making an assembly of the type illustrated in Fig. 6, the clip is first clamped to the flange of the support by being placed in position and turning down of the nut 24. Next, the sheet of roofing is laid over the clip, so that the bolt extends upwardly through a hole in the roofing. Then, the overlapping sheet 1 is laid in position and the nut 25 is applied and tightened. It is possible to place such clips on the supports and then install roof covering sheets from above, without building a scaffolding and requiring men to work below the covering of the roof at the time the covering is being laid.

It will be observed that the clip is adapted to hold sheets in position on flanges that slope either upward or downward.

The details that have been given are for the purpose of illustration and not restriction, and many variations therefrom may be made without departing from the spirit and scope of the invention.

What we claim is:

1. A structural assembly comprising, in combination, corrugated overlapping covering sheets, a support therefor including a flange and web member, spring clip fastening means having a leg of the clip engaging the side of the said flange opposite the covering sheets and another longer leg of the clip engaging the flange adjacent to the covering sheets and engaging also the edge of the web member of the support opposite the flange thereon, and means securing the covering sheets to the clip, the said longer leg of the clip including a portion in spring engagement with the under surface of a covering sheet and a stiffening springy portion extending to the said flange from the portion of the clip in engagement with the said sheet.

2. A structural assembly comprising, in combination, corrugated overlapping covering sheets, a support therefor, spring clip fastening means having a leg engaging the side of the support opposite the covering sheets and a second leg of the clip engaging the side of the support adjacent to the covering sheets, and means securing the covering sheets to the clip, the said second leg of the clip including a portion in spring engagement with the under surface of a covering sheet and a stiffening springy portion extending from the portion in engagement with the sheet to the said support.

3. A spring clip, adapted to secure corrugated sheets to a support, comprising two legs extending for a substantial distance in approximately parallel spaced planes, an intermediate springy portion connecting the said legs at one end thereof, and a springy inclined portion of one of the legs at a position therein relatively remote from the said intermediate portion, the said inclined portion extending towards the plane of the other leg and being adapted to contact with the said support.

4. A clip, adapted to secure sheeting to a support, comprising two spaced legs united at one end to each other, one of the said legs including two approximately parallel portions lying in different planes and a springy inclined portion connecting the said two approximately parallel portions, one of the said approximately parallel portions being adapted to contact with the sheeting and the other approximately parallel portion being adapted to contact with the support.

5. A clip, adapted to secure sheeting to a support, comprising two spaced legs united to each other at one end, one of the said legs including two approximately parallel portions lying in different planes, an inclined springy portion connecting the said approximately parallel portions, and an upset lip at the end of the leg adapted to engage an element of the supporting substructure.

PAUL A. VOIGT.
AARON E. SHULTIS.